United States Patent [19]

Houot

[11] 3,845,973
[45] Nov. 5, 1974

[54] APPARATUS FOR CONNECTING TWO PIPE ENDS BY REMOTE CONTROL

[75] Inventor: Jean Jacques Houot, Maisons-Lafitte, France

[73] Assignee: Entreprise de Recherches et d'Activites Petrolieres (ELF), Paris, France

[22] Filed: Sept. 4, 1973

[21] Appl. No.: 393,976

[30] Foreign Application Priority Data
Sept. 5, 1972 France .................. 72.31426

[52] U.S. Cl............. 285/26, 285/317, 285/DIG. 21
[51] Int. Cl............................................. F16l 35/00
[58] Field of Search ............ 285/24, 25, 26, 27, 28, 285/29, DIG. 21, 317; 166/.5, .6; 61/72.1, 72.3

[56] References Cited
UNITED STATES PATENTS

| | | | |
|---|---|---|---|
| 3,308,881 | 3/1967 | Chan et al. | 166/.6 |
| 3,339,632 | 9/1967 | Lewis | 166/.6 |
| 3,368,619 | 2/1968 | Postlewaite | 166/.6 |
| 3,604,731 | 9/1971 | Petersen | 285/29 |
| 3,713,275 | 1/1973 | Hyatt | 61/72.3 |

FOREIGN PATENTS OR APPLICATIONS

| | | | |
|---|---|---|---|
| 1,269,423 | 7/1961 | France | 166/.6 |
| 2,014,794 | 3/1970 | France | 166/.6 |

Primary Examiner—Dave W. Arola
Attorney, Agent, or Firm—Brisebois & Kruger

[57] ABSTRACT

Apparatus for connecting the ends of two pipes comprises a funnel, a cable extending through said funnel and attached to an end member which is itself rotatably attached to one of said pipes, and means in the funnel for directing said end member into a predetermined axial and radial position relative to said funnel, when said cable is pulled to draw said end member into said funnel.

10 Claims, 9 Drawing Figures

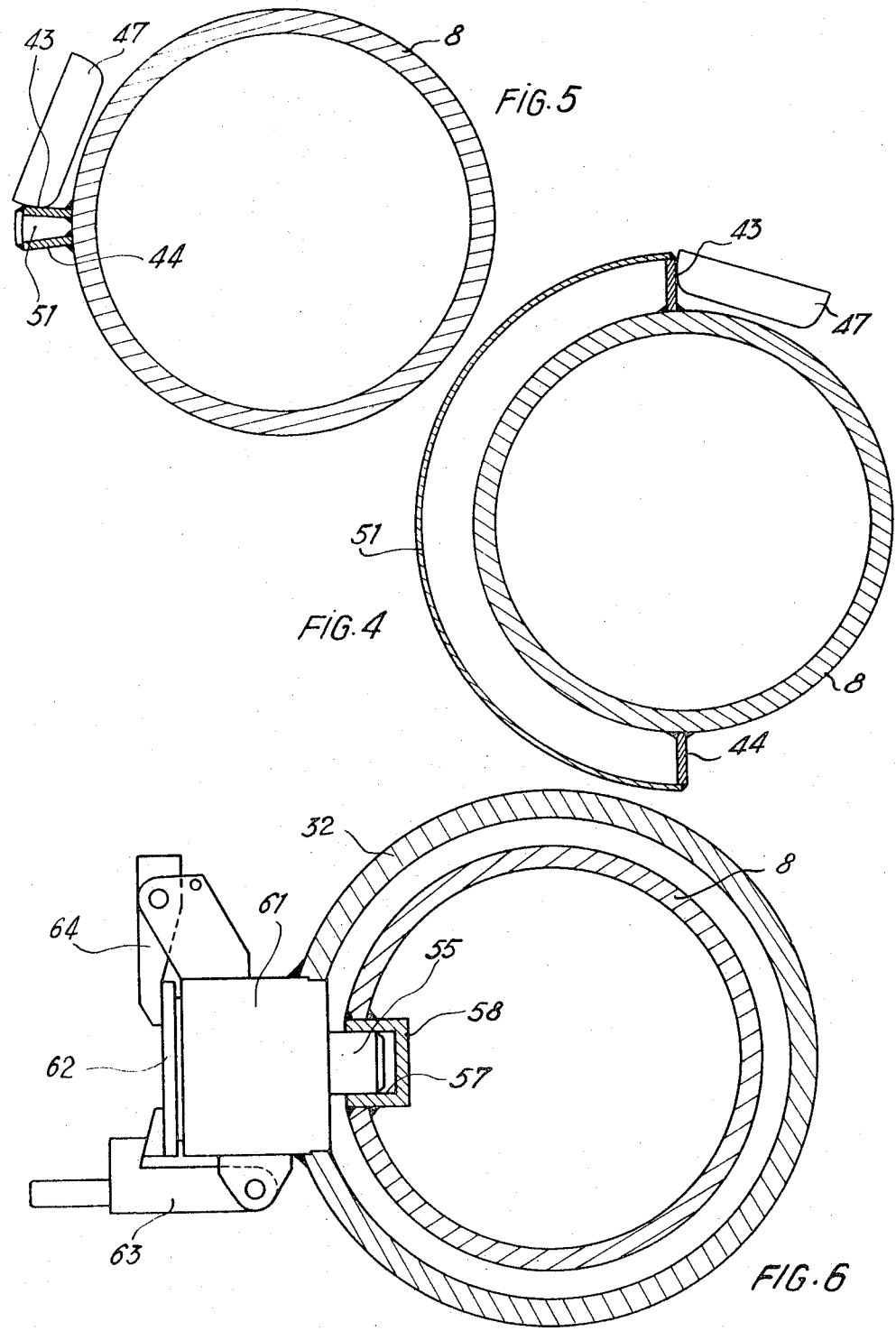

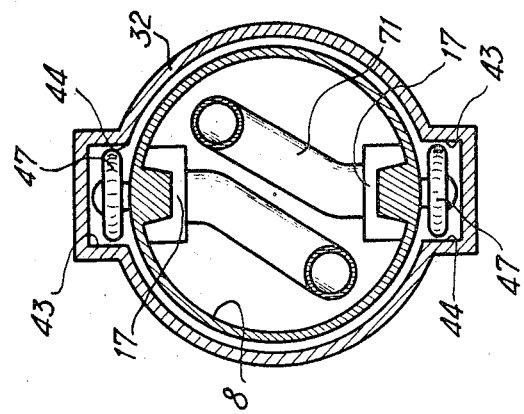
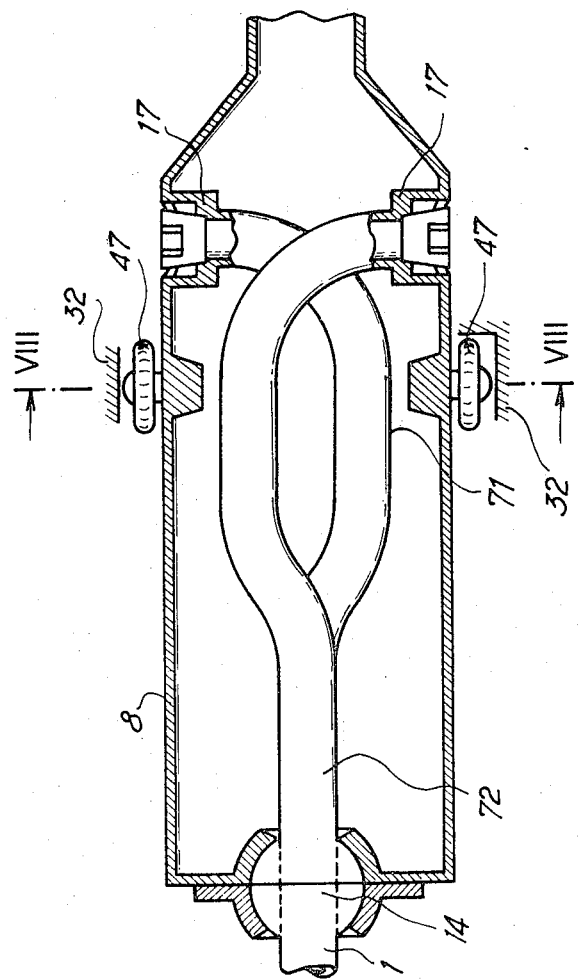
FIG. 8
FIG. 7

3,845,973

APPARATUS FOR CONNECTING TWO PIPE ENDS BY REMOTE CONTROL

SUMMARY OF THE INVENTION

The invention relates to apparatus for connecting the ends of two submarine or underwater pipes, by remote control. It is especially useful in the petroleum industry, for example for connecting a pipe connected to an exploitation well or a discharge pipe to a pipe connected to a swinging tower.

Apparatus for the remote connection of underwater pipes is already known which comprise a funnel into which extends a cable for pulling and introducing through the flared portion of the funnel a first end member integral with one of the pipe ends to be connected, and also means for connecting, to this first end member, when positioned in the narrow portion of the funnel, a second end piece integral with the other pipe end to be connected.

In known apparatus of this kind, as described for example in the U.S. Pat. application No. 517,595 of Dec. 30, 1965 in the name of SHELL INTERNATIONAL RESEARCH MANUFACTURING, the connection of two end members to one another is effected coaxially end to end, that is to say along the axis of the funnel, so that it is necessary, before connecting the two end members, to remove a guide previously fixed to the end of the narrow portion of the funnel for the passage of the pulling cable for the first end piece. But the positioning and removal of a guide of this kind of course constitutes extra work, and the apparatus in general is relatively complicated.

The object of the invention is to provide an apparatus for the remote connection of the ends of two underwater pipes of the type in question which does not have the aforesaid disadvantages.

For this purpose, according to the invention, the narrow portion of the funnel and the one end member are provided with associated means for their precise relative positioning axially and angularly in an operating position, the said end member being provided with at least one radial union which is connected to the pipe integral with this end member and which terminates in means for connection to associated means of the end of the second pipe.

Because of this very simple special construction, the apparatus is of lower cost price than the apparatus described hereinbefore, and pipe connection operations can be carried out therewith in a simpler fashion.

In an advantageous embodiment, the relative angular positioning means between the funnel and the first end member consist of at least one radial stud, preferably provided with a wheel, carried by one of these two parts and adapted to co-operate with helical ramps carried by the other part.

In one particular embodiment, the first end member is provided with two radial connecting unions the axes of which are situated in the same transverse plane end which are connected to the curved ends of the two branches of a Y-shaped tubular connector arranged within the said end member, the central branch of which is connected to the pipe which carries the said end member. Thus, an apparatus of very small bulk is provided although it comprises two radial connecting unions which permit relative angular positioning of the end piece in the funnel by a rotational movement having a maximum amplitude of only 90°, produced by the co-operation between two diametrically opposite studs and four helical ramps, each extending over an arc of 90°.

The invention will be better understood from a reading of the following description and a study of the accompanying drawings which show by way of illustration and example some constructional forms of an apparatus according to the invention for connecting the ends of two underwater pipes by remote control.

In these drawings:

FIGS. 3 to 6 are cross-sectional views taken respectively on the lines III—III, IV—IV, V—V and VI—VI of FIG. 2;

FIG. 7 is an axial sectional view taken through the end member of a second embodiment of the invention; and FIG. 8 is a cross-section taken along the line VIII—VIII of FIG. 7.

Figure 1:
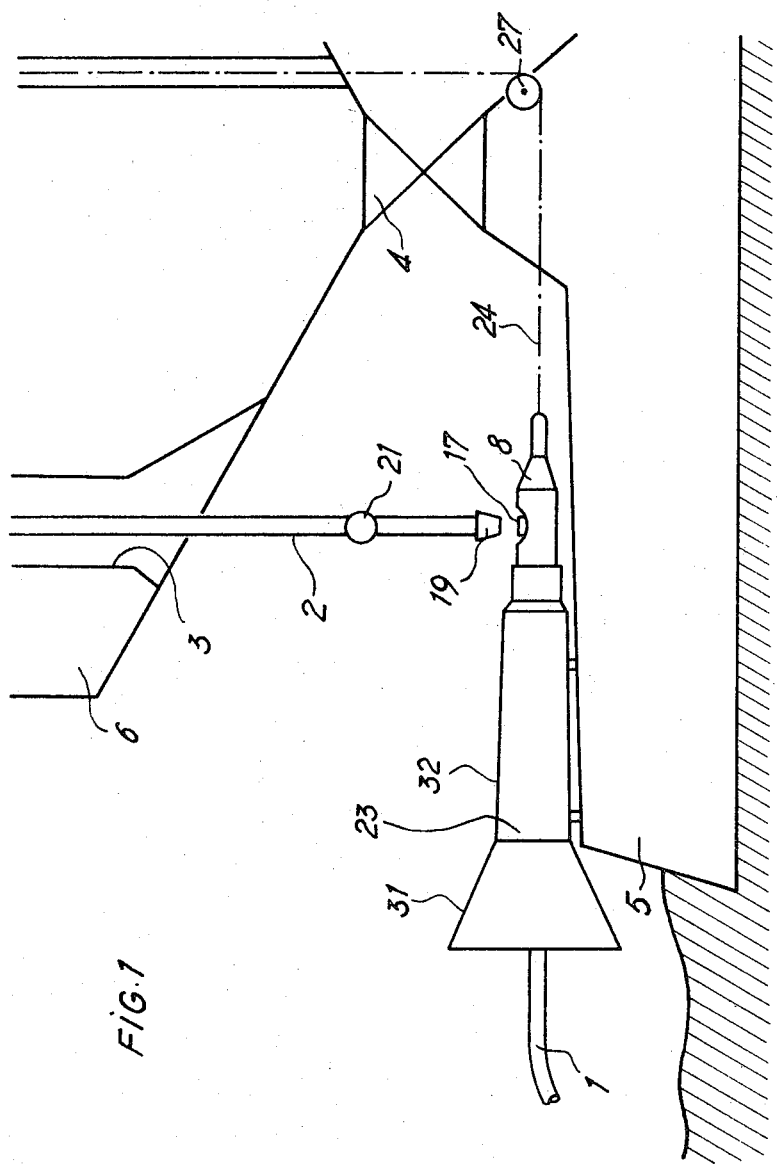
FIG. 1 is a diagrammatic elevational view of a first embodiment of a connecting apparatus according to the invention.

The apparatus shown in an overall view in FIG. 1 is intended to permit the remote connection of the ends of two underwater pipes 1, 2 as often has to be done in the petroleum industry, for example.

The pipe 1 is resting for example on the sea bed whereas the pipe 2 has come down in a vertical guide tube 3 in a platform 6 which rests by means of a universal joint 4 on a base 5, and which is suitably braced.

Figure 2:
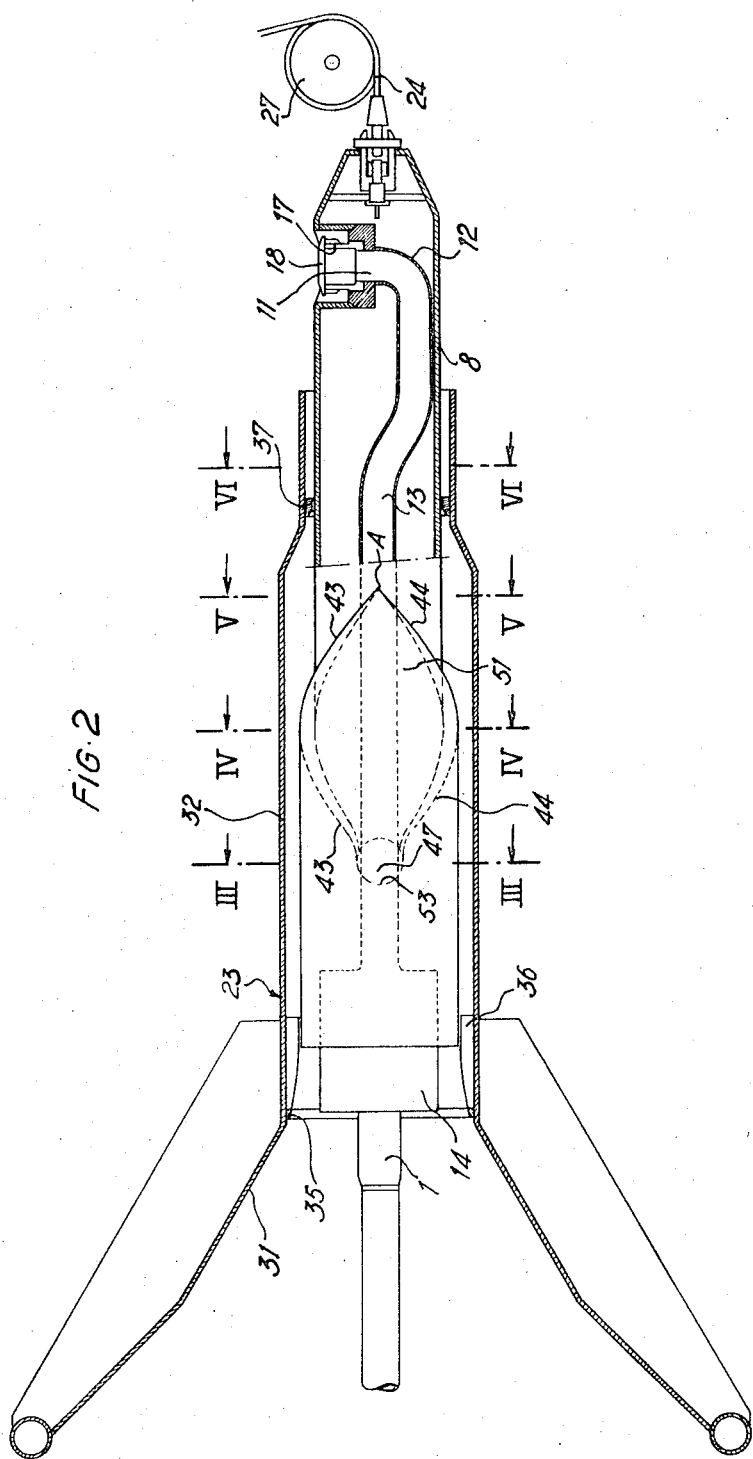
FIG. 2 is a partial section through the main portion of the apparatus of FIG. 1, taken on a larger scale.

The end of the pipe 1 in question is provided with a first end member 8 (see also FIG. 2) provided with a radial union 11 communicating with the pipe 1 through an elbow 12, a tube 13 and a rotary ball joint 14, such as that shown diagrammatically in the embodiment shown in FIG. 7, which permits the end member 8, tube 13 and elbow to turn about the axis of the pipe.

The radial union 11 terminates in connecting means 17 which are closed by a plug 18 and to which a second end member 19 attached to the corresponding end of the pipe 2 by a ball joint 21 can be connected.

The vertical operation for connecting the end member 19 of the pipe 2 to the connector 17 connected to the pipe 1 can be carried out only if the end member 8 which terminates the pipe 1 has been brought into a good position both axially and radially so that the connector 17 is exactly centered below the end member 19.

For this purpose a funnel 23 is mounted on the base 5. The axis of this funnel is horizontal and the end member 8 can be pulled into it by means of a cable 24 attached to the end of the said end member and connected to a winch (not shown) carried by the platform 6. A guide pulley 27 on the base 5 guides the cable 24 axially of the funnel 23.

The flared portion 31 of the funnel 23 facilitates the engagement of the end member 8 when it is drawn by the cable 24, and then the said end member is guided, centered and positioned both axially and angularly in the narrow portion 32 of the funnel 23 by means arranged and designed specially for this purpose.

The means for centering the end member 8 in the funnel 23 comprising a ring 35 and profiled ribs 36 at the entrance of the narrow portion 32 of the said funnel, by a ring 35 and another ring 37 at the outlet of the narrow portion of the funnel.

Figure 3:
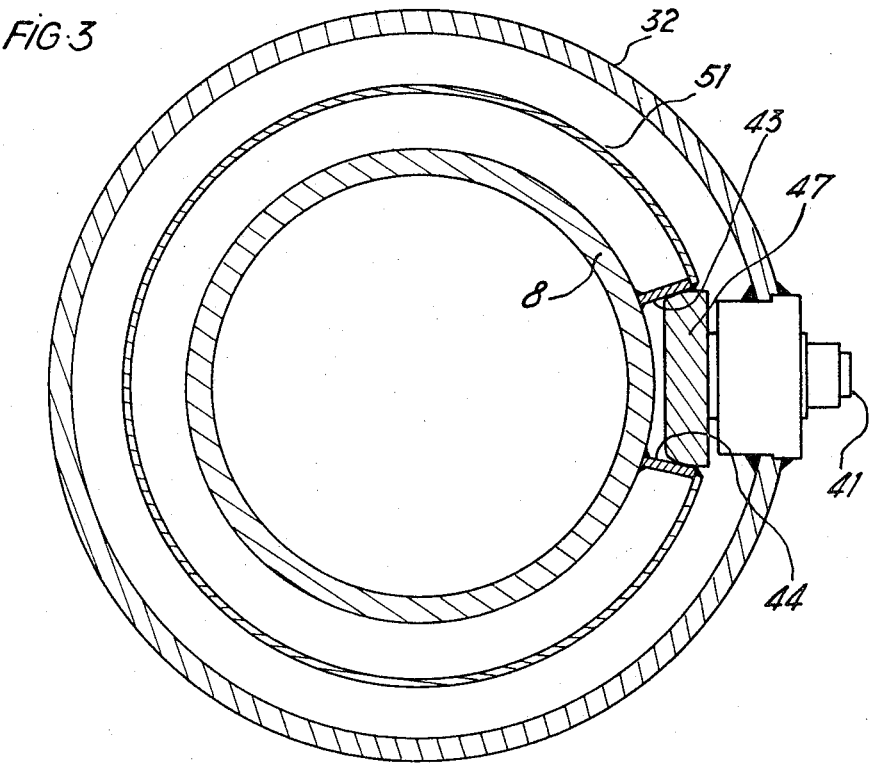
Figure 3A:
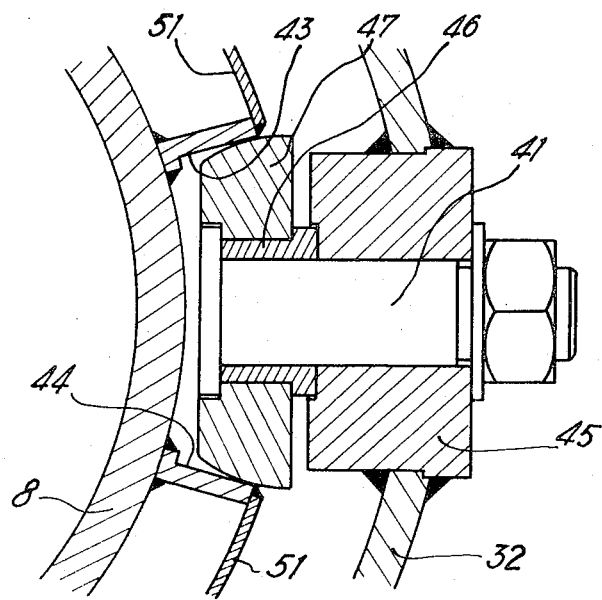
FIG. 3a is a partial sectional view, taken along the line III—III on a larger scale.

The means for angularly positioning the end member 8 in the funnel 23 consist, in this example, of a stud 41 (See also FIG. 3) integral with the narrow portion 32 of the funnel and co-operating with two helical ramps 43, 44 formed in the end member 8.

The stud 41 is mounted in a plug 45 in the narrow portion of the funnel and the head of the stud carries a spacer ring 46 on which a wheel 47 can rotate freely. This wheel is intended to roll along the helical ramps 43, 44.

In this example, the end member 8 comprises only a single radial connector 17 for connection with the other pipe 2, so that the end member 8 can occupy only a single correct angular position about its longitudinal axis in the funnel, that is to say the position illustrated in the drawings.

Since the end member 8 enters the funnel in an absolutely random angular position, it must be caused, in order to be brought into the correct angular position, to undergo a rotating movement which may be through an angle of as much as 180°. The two helical ramps 43, 44 are thus given an opposite pitch. They start from point A (FIG. 2) situated on a generatrix of the end member 8 and extend away from one another until they are on two diametrally opposite generatrices (FIG. 4). They then follow a helical path on the cylindrical surface of the end piece 8 until they bracket the wheel 47 (see also FIG. 3). In other words, the two helical ramps 43, 44 define on the cylindrical surface of the end member 8 a projection in the form of a portion of a hollow annular cylinder the circumferential extent of which starts from zero at the point A and increases gradually to a semi-circle (FIG. 4) and finally almost occupies almost the entire circumference of the end member 8, leaving only a groove, the width of which is equal to the diameter of the wheel 47 (FIG. 3) and which forms on the end member 8 an axial abutment 53 for the wheel 47, adapted to determine precisely the relative longitudinal position of the end member in the funnel. When the wheel reaches this position, the radial connector 17 is beyond the narrow end of the funnel, exactly on the vertical axis of the pipe 2 to which the pipe 1 is connected.

So that no relative displacement can take place between the end member and the funnel, once they have been suitably positioned relatively to one another, both in the radial direction and in the axial direction, there is provided a locking device consisting, in this example, of a cylindrical locking bolt 55 which can engage in a blind hole 57 formed in a plug 58 in the end member 8. The locking bolt 55 is integral with the mobile member of a device 61 fixed to the narrowed portion of the funnel.

In one embodiment, the locking bolt 55 is biased by a spring positioned within the casing 61. In another embodiment the device 61 is a hydraulic jack controlled from the surface of the sea through a suitable connection.

In both cases the means for exerting pressure on the bolt 55 bears on a reaction plate 62. This reaction plate is immobilized by hooks which can be operated by hand such as 63, or by fingers such as 64. The withdrawal of these hooks or fingers by means of an independent plunger makes it possible to release the reaction plate 62 and consequently to withdraw the locking bolt 55, if the disconnection of the pipe line becomes necessary.

The apparatus operates as follows:

The end member 8 which terminates the pipe 1 is assumed to be, before any operation, outside the funnel 23, in the region of the flared portion 31 of the funnel. The cable 24 extends through the funnel and is attached to the end of the end member. By means of the winch on which the other end of the pulling cable 24 is wound, the end member 8 is drawn through the funnel. It first enters the flared portion 31 of the funnel in which it is centered and, irrespective of the angular orientation of the end member 8, one of the two helical ramps 43 or 44 at a certain moment impinges on the wheel 47 carried by the funnel. Depending on which of the two ramps comes into contact with the wheel, the latter causes the end member 8 to rotate in one direction or the other as it is axially displaced by the cable 24. This helical movement is continued until the common end 53 of the two helical ramps contacts the wheel 47. At this instant, the end member 8 is perfectly positioned in the funnel both in the axial direction and in the circumferential direction, so that the radial connector 17 is situated exactly axially of the end member 19 of the pipe 2. The locking bolt 55 is moved into its operative position and from then onward it is certain that the various parts of the apparatus cannot be subjected to relative displacement.

By means of a suitable tool moved downwards through the guide tube 3 in a conventional manner the plug 18 is removed, and taken upwards, and then the pipe 2, provided with its end member 19, is lowered and positioned on the connector 17. The junction between the two pipes is then effected.

In the embodiment which has just been described, it has been assumed that the wheel 47 was carried by the funnel and that the helical ramps were integral with the mobile end member 8, but the arrangement could be reversed, that is to say, the wheel could be carried by the mobile end member while the helical ramps are formed part of the funnel. This arrangement is shown in FIG. 7 and FIG. 8 where it has also been assumed that the end member 8 connected to the pipe 1 is provided with two radial unions 17 on two diametrally opposite generatrices of the end member 8 and in the same transverse plane. The two unions 17 are connected to the curved ends of two legs of a tubular connector of Y-shaped form 71, arranged within the end member 8 with its central leg 72, which serves the purpose of the tube 13 of the embodiment shown in FIG. 2, connected to the pipe 1 by the rotary joint 14.

Furthermore, since either of the two radial connectors 17 can be brought into the connecting position with the end member 19 of the pipe 1 (FIG. 1), the maximum amplitude of pivoting movement which the end member 8 need undergo is only 90° instead of 180°. Therefore two wheels 47 have been provided instead of a single wheel, each carried, as has been stated, by the end member 8 and adapted to co-operate with the helical ramps, which are now four in number, that is to say forming two pairs of ramps 43, 44 which start from two diametrally opposite generatrices and which end in two intermediate generatrices. Whatever the angular position in which the end member enters the funnel, it can be brought into a correct final position for connection by a rotary movement of at most 90° and then the wheels 47 will encounter one face or other of the four helical ramps, which brings them either into the position shown in FIG. 7, in which it is one of the two connectors 17 which is in the upper connecting position, or into the diametrically opposite position in which is is the other connector 17 which will be uppermost.

Of course the invention is not limited to the embodiments described and illustrated, and modifications can be made thereto in accordance with the intended uses to which the invention is to be put, without departing from the basic principles of the invention.

Thus, for example, it has been assumed that the radial connector 17, after correct positioning, is situated beyond the narrow end of the funnel, but it could also be situated completely within the said narrow portion of the funnel, in which case the latter would be apertued opposite the connector 17 so that the connecting-up operation can be carried out.

What is claimed is:

1. In apparatus for the connection of the ends of two pipes by remote control, said apparatus comprising a funnel member having a flared portion and a narrow portion, together with a cable extending through said funnel, the improvement which comprises
    an end member attached to said cable so that said cable can pull said end member through said flared portion into said narrow portion of said funnel, and means for rotatably attaching said end member to one end of one of said pipes,
    cooperating means in the narrow portion of said funnel and on said end member for positioning said end member in a precise longitudinal and radial position relative to said funnel as it is pulled thereinto by said cable,
    means for holding one end of the other pipe in a precise position at an angle to the axis of said funnel, and
    union means projecting radially from said end member and adapted to cooperate with mating union means on said one end of said other pipe.

2. Apparatus according to claim 1 in which said cooperating positioning means comprise at least one radial stud on one of said members positioned to cooperate with helical ramps on the other of said members.

3. Apparatus according to claim 2 in which the helical ramps are provided on one of two facing cylindrical surfaces belonging to said two members, whereas the studs are carried by the other of the said cylindrical surfaces.

4. Apparatus according to claim 3 in which said end member comprises only a single radial connecting union and the positioning means comprises only a single stud, but there are two helical ramps of opposite pitch, each extending over an arc of 180°.

5. Apparatus according to claim 3 in which said end member comprises two unions for radial connection located on two diametrically opposite generatrices of said end member and said, positioning means comprises two studs also arranged on two diametrally opposite generatrices, whereas the helical ramps are four in number and each ramp extends over an arc of 90°.

6. Apparatus according to claim 2 in which the helical ramps terminate in an axial abutment for the stud.

7. Apparatus according to claim 1 which comprises a locking system for locking said end member in said precise position relative to said funnel member.

8. Apparatus according to claim 1 in which each radial union on the end member is situated beyond the narrowed portion of the funnel when said end member is in said precise position.

9. Apparatus according to claim 1 in which each radial union on said end member is situated within the narrowed portion of the funnel, and the latter comprises an aperture opposite each of the said radial unions to permit connection with the other pipe.

10. Apparatus according to claim 1 in which the first end member is provided with two radial connecting unions whose axes are situated in one and the same transverse plane and which are connected to the curved ends of the two legs of a tubular Y-shaped connector arranged within the said end member with the cental leg connected to the pipe which carries the said end member.

* * * * *